(12) United States Patent
Fathalla (10) Patent No.: US 7,568,188 B2
(45) Date of Patent: Jul. 28, 2009

(54) METHOD FOR TESTING A SOFTWARE SHIM (75) Inventor: Diaa Fathalla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 10/383,994

(22) Filed: Mar. 7, 2003

(65) Prior Publication Data
US 2004/0177338 A1    Sep. 9, 2004

(51) Int. Cl.
G06F 9/44 (2006.01)
G06F 9/46 (2006.01)

(52) U.S. Cl. ............... 717/135; 717/121; 717/126; 719/331

(58) Field of Classification Search ............... None
See application file for complete search history.

(56) References Cited

U.S. PATENT DOCUMENTS

| 5,291,598 A * | 3/1994 | Grundy ............... 726/28 |
| 5,548,759 A * | 8/1996 | Lipe ............... 707/100 |
| 5,613,002 A * | 3/1997 | Kephart et al. ............ 726/24 |
| 5,870,467 A * | 2/1999 | Imai et al. ............... 705/57 |
| 5,892,904 A * | 4/1999 | Atkinson et al. ............ 726/22 |
| 5,991,802 A | 11/1999 | Allard et al. |
| 6,370,561 B1 | 4/2002 | Allard et al. |
| 6,895,463 B2 * | 5/2005 | Oga et al. ............... 711/103 |
| 6,898,788 B2 * | 5/2005 | Kosaka et al. ............ 717/162 |
| 7,076,770 B2 * | 7/2006 | Handal ............... 717/136 |
| 7,287,259 B2 * | 10/2007 | Grier et al. ............ 719/331 |

OTHER PUBLICATIONS

"Windows XP Application Compatibility Technologies", Morehouse et al., Jun. 2001, pp. 1-10. Online retrieved at <http://technet.microsoft.com/en-us/library/bb457032(printer).aspx>.*

"Understanding the Application Compatibility Technologies", Microsoft Windows $^{xp}$, retrieved from http://www.microsoft.com/middleeast/windows/windowsxp/professional/compi.../page1.ht on Dec. 12, 2002 (pp. 1 of 5).

* cited by examiner

Primary Examiner—Tuan Q Dam
Assistant Examiner—Thuy Dao
(74) Attorney, Agent, or Firm—Wolf, Greenfield & Sacks, P.C.

(57) ABSTRACT

A method for testing a software shim is provided, in which a skeleton executable file is altered so that it mimics the executable file for which the shim is intended. The alterations made to the skeleton executable file may include one or more of the following: changing the file name, padding the file and changing the calculated checksum of the file.

19 Claims, 5 Drawing Sheets

METHOD FOR TESTING A SOFTWARE SHIM

TECHNICAL FIELD OF THE INVENTION

The invention relates generally to software testing and, more particularly, to techniques for testing shims for executable files without having to install the executable files themselves.

BACKGROUND

To satisfy the needs of their customers, software vendors continuously test and update their products. While some of these updates come in the form of full product releases, many of them come in the form of software patches or "shims." Shims, like the products they are designed to enhance, require extensive testing and verification. One way to test a software shim is to load the full software product for which the shim is intended and then run the shim on top of the product. However, loading an entire software product can be very time consuming, making it impractical to test a large number of shims in this manner.

SUMMARY

In accordance with the foregoing, a method for testing software shims is provided herein. According to various embodiments of the invention, a skeleton executable file is altered so that it mimics the executable file for which the shim is intended. The alterations made to the skeleton executable file include one or more of the following: changing the file name, padding the file, changing some of the file's header attributes and/or resource attributes. In one embodiment of the invention within the Windows® operating system, an AppCompat checksum is a calculated checksum, which is different from a PEChecksum that is calculated for a whole file. The AppCompat checksum is specific to the Application Compatibility and is a small portion of the file and calculated using a specific AppCompat algorithm.

Although the AppCompat checksum is a convenient checksum available from the Windows® operating system, any other algorithm also works. For example, the algorithm generating the checksum may simply sum the first 1000 bytes of the executable. In a specific example, the executable to be simulated, FOO.EXE, has a checksum of 12345 and the executable we want to simulate the appearance of FOO.EXE, SIMULATE.EXE, has a checksum of 12000. In this case, the contents of byte number 1000 of the SIMULATE.EXE (call the contents "N") are copied to a storage location and added to the difference between 12000 and 12345, which is 345. The sum (N+345) is injected at byte 1000 of SLMULATE.EXE so its checksum (i.e., summing the first 1000 bytes) is 12345, which is the same as the checksum for FOO.EXE. To restore SIMULATE.EXE prior to runtime so that it executes correctly, the entry point for execution is re-directed to a piece of assembly code appended to the end of STMiULATE.EXE's code section. The assembly code restores N+345 at byte 1000 to N during run time and then jumps to the original entry point of the executable in order to continue executing.

Additional aspects of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention may be best understood from the following detailed description taken in conjunction with the accompanying drawings of which:

DETAILED DESCRIPTION

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, programs include routines, objects, components, data structures and the like that perform particular tasks or implement particular abstract data types. The term "program" as used herein may connote a single program module or multiple program modules acting in concert. The term "computer" as used herein includes any device that electronically executes one or more programs, such as personal computers (PCs), hand-held devices, multi-processor systems, microprocessor-based programmable consumer electronics, network PCs, minicomputers, mainframe computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
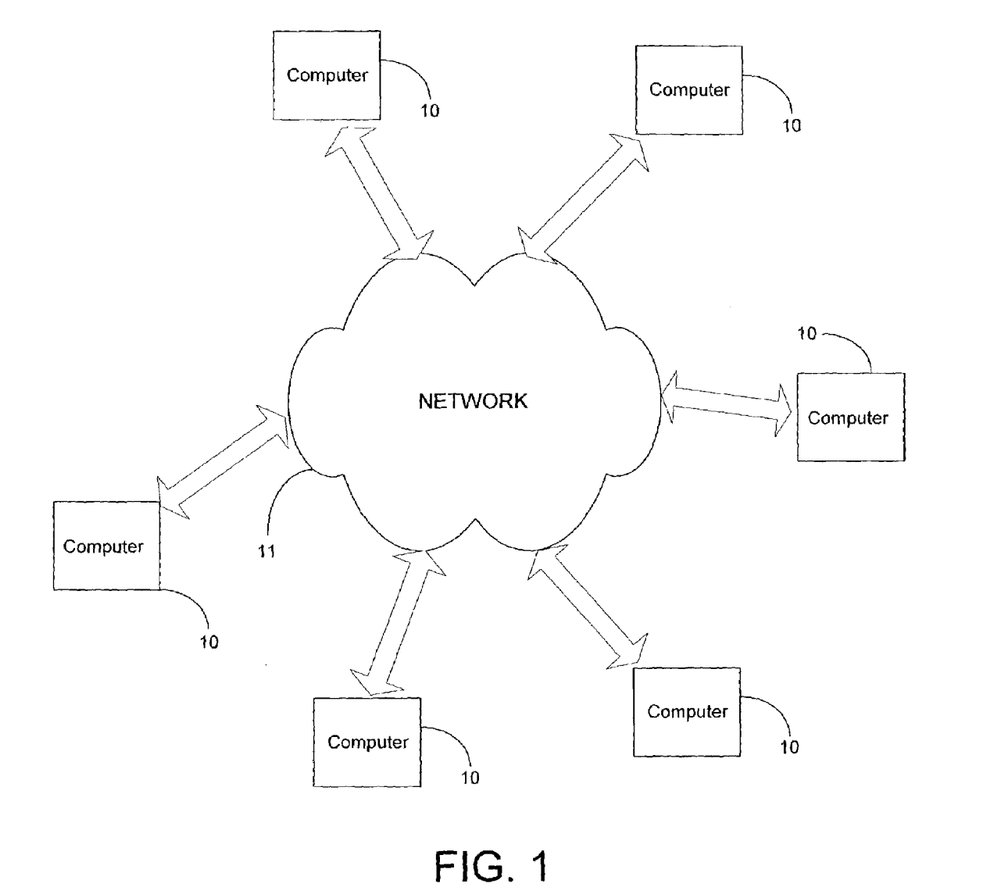
FIG. 1 illustrates an example of a computer network in which the invention may be practiced.

An example of a networked environment in which the invention may be used will now be described with reference to FIG. 1. The example network includes several computers 10 communicating with one another over a network 11, represented by a cloud. Network 11 may include many well-known components, such as routers, gateways, hubs, etc. and allows the computers 10 to communicate via wired and/or wireless media. When interacting with one another of the network 11, one or more of the computers may act as clients, servers or peers with respect to other computers. Accordingly, the various embodiments of the invention may be practiced on clients, servers, peers or combinations thereof, even though specific examples contained herein don't refer to all of these types of computers.

Figure 2:
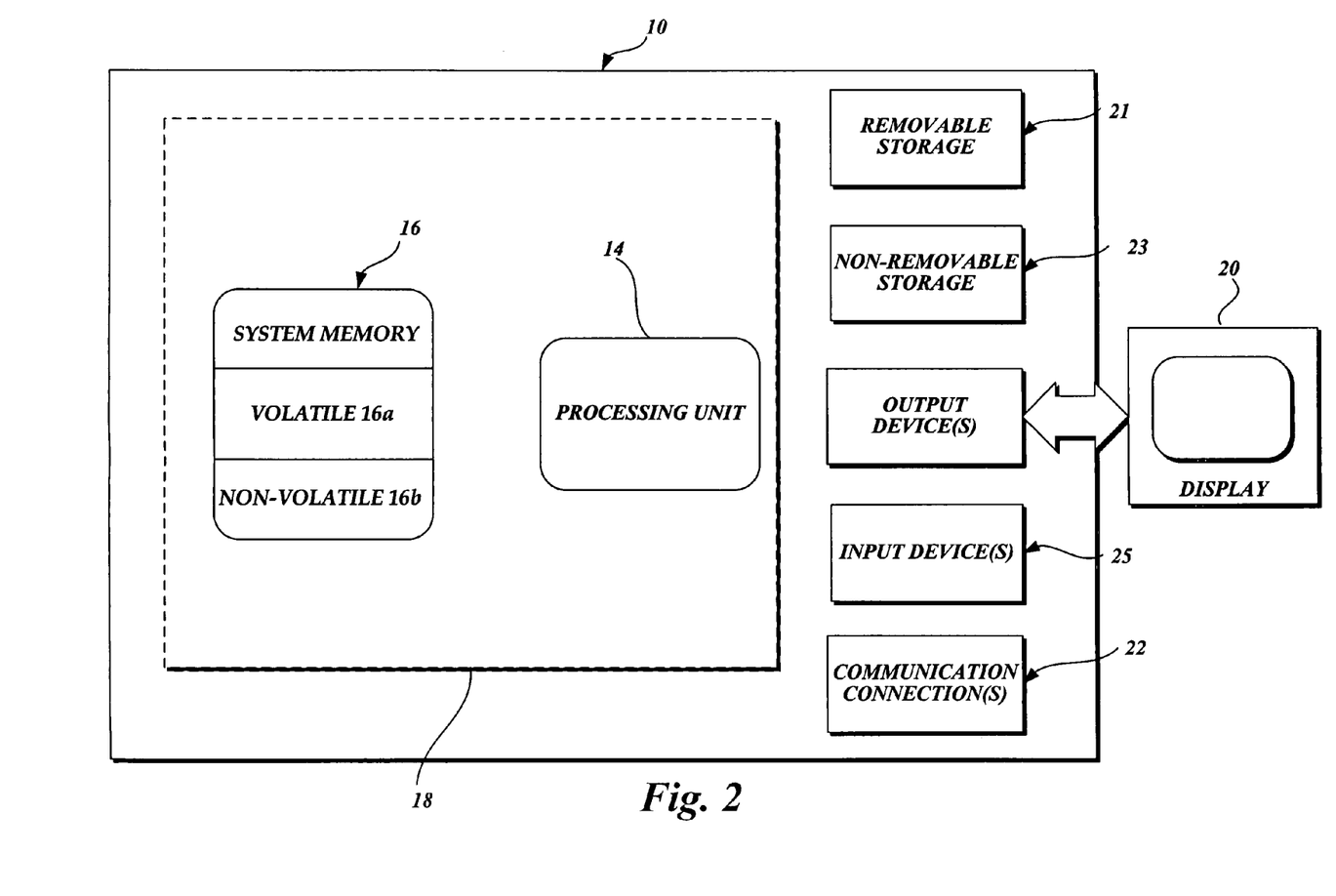
FIG. 2 illustrates an example of a computer on which at least some parts of the invention may be implemented.

Referring to FIG. 2, an example of a basic configuration for a computer on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. At least some of these instructions are generated by an operating system. The operating system may include several user mode and kernel mode programs. Depending on the exact configuration and type of the computer 10, the memory 16 may be volatile 16a (such as RAM), non-volatile 16b (such as ROM or flash memory) or some combination of the two. This most basic configuration is illustrated in FIG. 2 by dashed line 18. Additionally, the computer may also have additional features/functionality. For example, computer 10 may also include additional storage (such as a removable storage 21 and/or a non-removable storage 23) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to store the desired information and which can be accessed by the computer 10. Any such computer storage media may be part of computer 10.

Computer 10 may also contain communications connections 22 that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term "computer-readable medium" as used herein includes both computer storage media and communication media.

Computer 10 may also have input devices 25 such as a keyboard, mouse, pen, voice input device, touch input device, etc. Output devices such as a display 20, speakers, a printer, etc. may also be included. All these devices are well known in the art and need not be discussed at length here.

Figure 3:
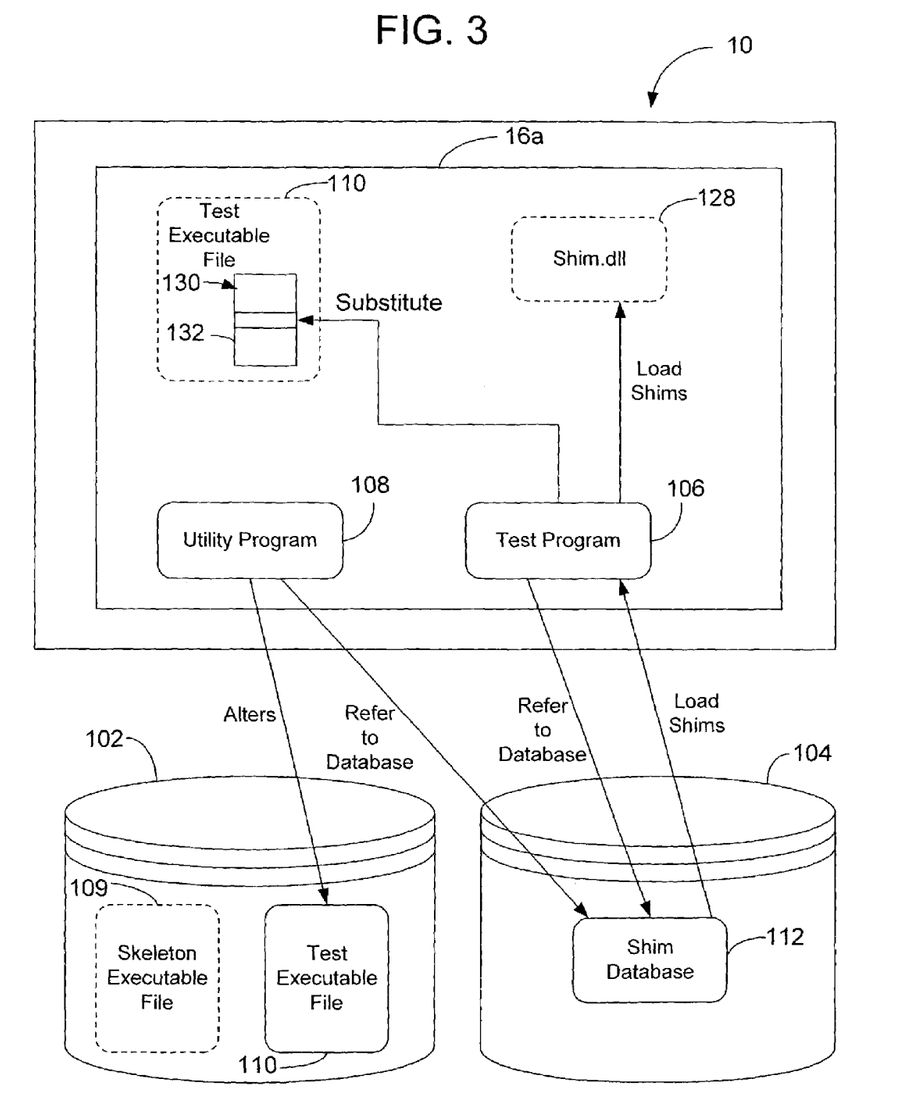
FIG. 3 illustrates a computer system configured in accordance with an embodiment of the invention.

Turning to FIG. 3, a computer system is illustrated that includes one of the computers 10, its volatile memory 16a and first and second non-volatile memories 102 and 104, respectively. The non-volatile memories may be part of the non-volatile memory 16b of the computer 10 as illustrated in FIG. 2 or they may be part of another one of the computers 10 forming the network of FIG. 1. Stored on the first non-volatile memory 102 is a skeleton executable file 109 named "FOO.EXE" while a shim database 112 is stored on the second non-volatile memory 104. A test program 106 and a utility program 108 are stored in the non-volatile memory 16a.

The shim database 112 contains software shims that can be applied to various executable files. The shim database 112 also contains data regarding each of the shims. Such data includes, but is not necessarily limited to, the attributes listed in Table 1 below. The utility program 108, in general, alters executable files so that that they mimic other executable files. The test program 106 loads executable files into the volatile memory 16a from the first non-volatile memory 102, references the shim database 112 to determine which shims, if any, are required to execute the executable files, and runs the executable files with the appropriate shims, thereby testing the functionality of the shims.

Referring again to FIG. 3, an example of how the various components of the computer system operate in an embodiment of the invention will now be described. The utility program 108 receives a user input that indicates that the executable file called "Application.exe" is to be simulated. The utility program 108 then references the shim database 112 to determine what characteristics the indicated executable file has. The utility program 108 then obtains the skeleton executable file 109, named "FOO.EXE," which has sufficient functionality to test shims, but does not perform any of the significant functions of the executable file specified by the user. The skeleton executable file 109 has a header having several fields, and a resource section that also has several fields. The names of some of the fields of the skeleton executable file 109 as well as the values contained in those fields are shown below in Table 1:

TABLE 1

| Type | XML Attribute | Value |
| --- | --- | --- |
| File Name | NAME | "FOO.EXE" |
| File Size (in bytes) | SIZE | 1000 |
| Checksum | CHECKSUM | 0x5FA94E03 |
| Company Name | COMPANY_NAME | (null) |
| Product Name | PRODUCT_NAME | (null) |
| Product Version (string) | PRODUCT_VERSION | "1.0" |
| File Version (string) | FILEVERSION | "1.0" |
| Binary Product Version | BIN_PRODUCT_VERSION UPTO_BIN_PRODUCT_VERSION | 1.0 |
| Binary File Version | BIN_FILE_VERSION | 1.0 |
| File Description | FILE_DESCRIPTION | "Skeleton Executable" |
| Original Filename | ORIGINALFILENAME | "Foo.exe" |
| Internal Name | INTERNALNAME | "Skeleton Executable" |
| Legal Copyright | LEGALCOPYRIGHT | "Copyright © Microsoft Corporation 2002. All rights reserved." |

The header of the skeleton executable file 109 contains the File Name, File Size and Checksum fields, while the resource section of the skeleton executable file 109 contains the Company Name, Product Name, Product Version, File Version, Binary Product Version, Binary File Version, File Description, Original Filename, Internal Name and Legal Copyright.

The utility program 108 alters the skeleton executable file 109 to create a test executable file 110, which mimics the file "Application.exe." In this example, the utility program 108 makes the following alterations:

TABLE 2

| Type | XML Attribute | Old Value | New Value |
|---|---|---|---|
| File Name | NAME | "FOO.EXE" | "WINWORD.EXE" |
| File Size (in bytes) | SIZE | 1000 | 8798260 |
| Checksum | CHECKSUM | 0x5FA93344 | 0x5FA94E03 |
| Company Name | COMPANY_NAME | (null) | "Microsoft Corporation" |
| Product Name | PRODUCT_NAME | (null) | "Microsoft Office 2000" |
| Product Version (string) | PRODUCT_VERSION | "1.0" | "9.0.2717" |
| File Version (string) | FILEVERSION | "1.0" | "9.0.2717" |
| Binary Product Version | BIN_PRODUCT_VERSION UPTO_BIN_PRODUCT_VERSION | 1.0 | 9.0.2717 Note: If the UPTO_ prefix is used, then a less-than-or-equal-to comparison is done |
| Binary File Version | BIN_FILE_VERSION | 1.0 | 9.0.2717 |
| File Description | FILE_DESCRIPTION | "Skeleton Executable" | "Microsoft Word Main Executable" |
| Original Filename | ORIGINALFILENAME | "Foo.exe" | "WinWord.exe" |
| Internal Name | INTERNALNAME | "Skeleton Executable" | "WinWord" |
| Legal Copyright | LEGALCOPYRIGHT | "Copyright © Microsoft Corporation 2002. All rights reserved." | "Copyright © Microsoft Corporation 1983-1999. All rights reserved." |

Additionally, the utility program 108 alters certain data in the test executable file 110 so that when a checksum is calculated on the test executable file 110, the result of the checksum calculation will be equal to the checksum of WINWORD.EXE. In this example, it is assumed that checksum is calculated by summing the values of all of the double words in the first 4000 bytes of a file. Thus, the utility program 108 alters at least one double word of the test executable file 110 such that the value of the checksum calculated on the first 4000 bytes of the test executable file 110 changes from 0x5FA93344 to 0x5FA94E03. To illustrate a way in which the utility program could accomplish this—assume that the last double word of the first 4000 bytes of the test executable file 109 has a value of 0x00034266. To make the checksum of that first 4000 bytes equal to 0x5FA94E03, the utility program 108 needs to add (0x5FA94E03−0x5FA93344)= 0x00001ABF to that final double word. Thus, the utility program 108 changes the value of the last double word from 0x00034266 to (0x00034266+0x00001ABF)=0x00035D25.

Figure 4:
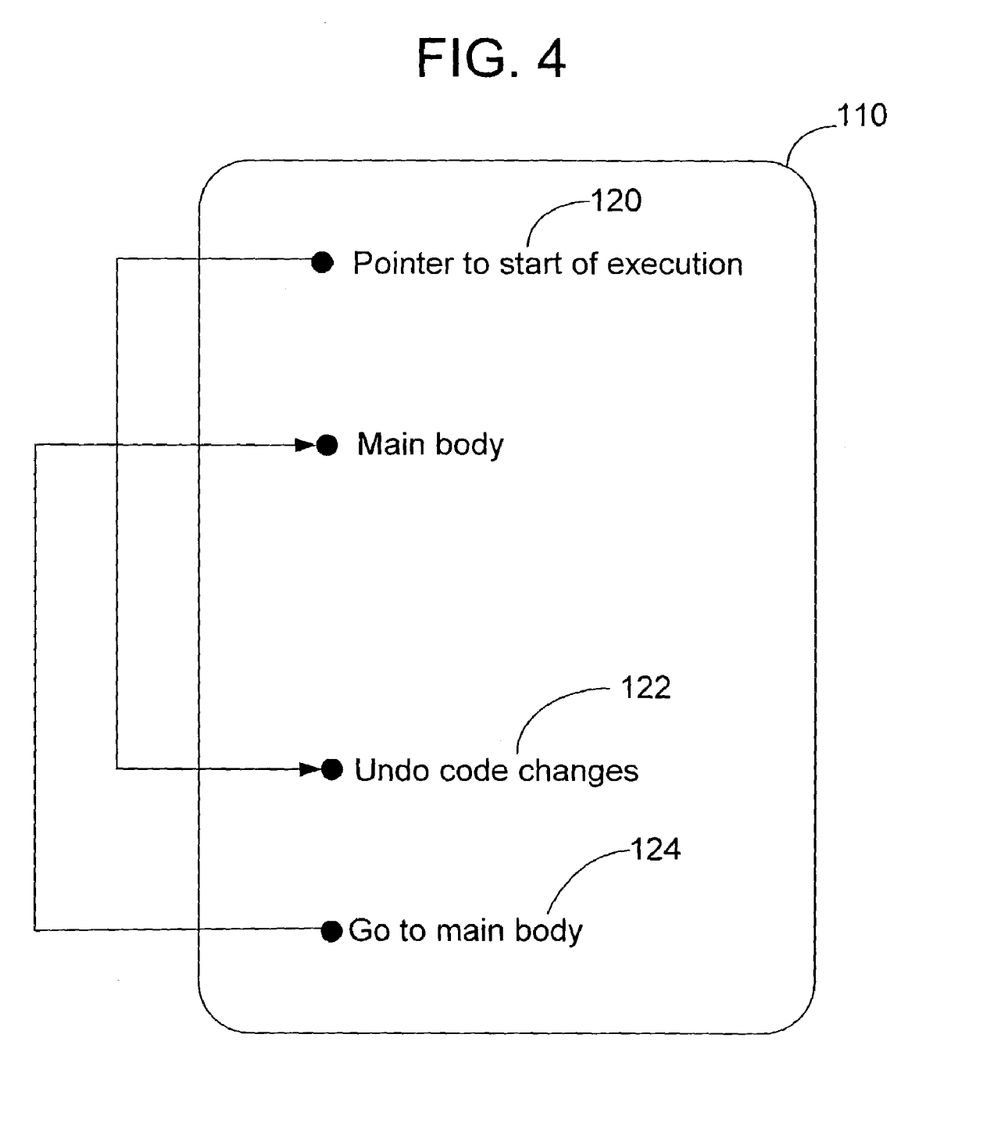
FIG. 4 illustrates an executable file having code that changes data back to its original state in accordance with an embodiment of the invention.

To ensure that the portion of the test executable file 110 that the utility program 108 alters for the purpose of changing its checksum gets changed back to its original state, the utility program inserts certain instructions into the test executable file 110. These instructions, when executed, replace the portion altered for calculating the checksum with the original version. An example of how this is accomplished will now be described in the context of the example above, and with reference to FIG. 4, in which the test executable file 110 is shown. As with most executable files that have PE Format "Portable Executable Format," the test executable file 110 includes a first line 120 of instructions that indicates the address at which execution of the test executable file 110 is to begin. The utility program 108 changes the instructions of the first line 120 so that they indicate an address of a second line 122 of instructions, which is farther down in the test executable file 110. Thus, when a processor executes the test executable file 110, the processor jumps to the second line 122. The second line 122 includes instructions for undoing the changes that were originally made to the test executable file. If, as noted above, the utility program 108 had previously changed the value of the last double word from 0x00034266 to 0x00035D25, the instructions in the second line 122 would change the double word back to 0x00034266. Following the second line 122, there is a third line 124 having instructions that, when executed, cause the processor to skip back to the main body of the test executable file 110.

Figure 5:
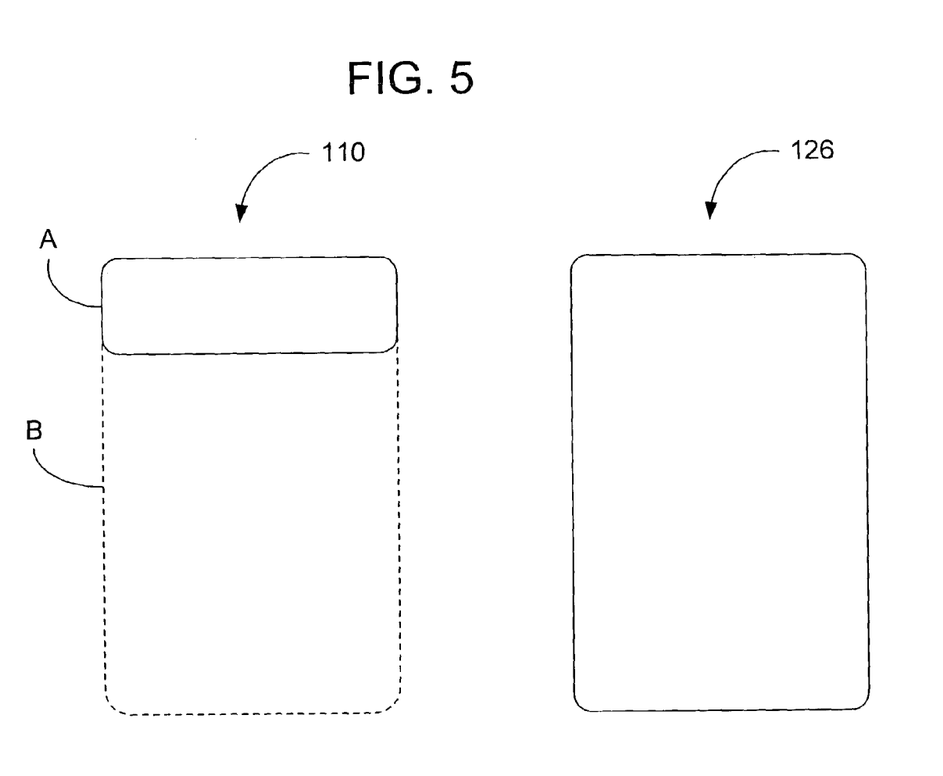
FIG. 5 illustrates how an executable file gets padded in accordance with an embodiment of the invention.

Finally, the utility program 108 pads the test executable file 110 with enough dummy data to make the test executable file 110 equal in size to the actual executable file. Referring to FIG. 5, the test executable file 110 and an executable application file 126 are shown. It is assumed that the executable application file 126 is the file that the test executable file 110 is intended to mimic. Prior to being padded by the utility program 108, the test executable file 110 is limited to a portion denoted as A in FIG. 5. Portion A includes executable code, a header and a resource section. The utility program 108 ascertains the number of bytes in portion A and calculates the difference between that number and the number of bytes in the executable application file 126. The utility program 108 then pads portion A with a dummy data portion, denoted as B in FIG. 5, which is equal in size to the calculated difference.

Once the utility program 108 has modified the test executable file 110 sufficiently to mimic the executable application program, the utility program 108 passes, to the test program 106, a reference to the test executable file 110. The test program 106 analyzes the test program 106 to determine its characteristics, including those items of the header and resource section of the test executable file 110 listed in Table 1. The test program 106 then refers to the shim database 112 in the second non-volatile memory 104 to determine which shims to retrieve. Once the test program 106 makes this determination, it loads a dynamic linked library 128 from the shim database 112 and into the volatile memory 16a. The dynamic linked library 128 contains the shims to be tested for the particular build of WINWORD.EXE that the test executable file is meant to mimic. The test program 106 also loads the test executable file 110 into the volatile memory 16a.

Continuing with the example, once the test executable file 110 is loaded into the volatile memory 16a, it is given its own process address space. Within that address space, an import table 130 is defined. The import table contains pointers to various functions that the test executable file 110 needs to call, including a pointer 132 that will be used in a subsequent example. The test program 106 analyzes the import table 130 to determine which functions need to have shims applied. The test program then substitutes the appropriate pointers with pointers to the shims corresponding to the functions. To illustrate, assume that the pointer 132 shown in the import table 130 is a pointer to the operating system function GET_VERSION, which returns a string that identifies the version of the current operating system. Further assume that the current operating system on the computer 10 is the MICROSOFT® WiNDOWS® XP. Thus, if the test executable file 110 makes the GET_VERSION call, the operating system would respond with the string MICROSOFT® WINDOWS® XP. The test program 106 substitutes a pointer to a shim in the dynamic linked library 128 for the pointer 132 that is currently in the test executable file 110. The shim in this case is a software routine that responds to the GET_VERSION function call with the string MICROSOFT® WINDOWS® XP. Such a shim is often used in situations where an application program was originally intended for use with an older operating system, but needs to be modified for use with a newer operating system.

It can thus be seen that a new and useful method for testing a software shim has been provided. In view of the many possible embodiments to which the principles of this invention may be applied, it should be recognized that the embodiments described herein with respect to the drawing figure is meant to be illustrative only and should not be taken as limiting the scope of the invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. In a computer system including a first executable file and a software shim, wherein the software shim is operable to be executed in conjunction with the first executable file, a method for simulating the first executable file using a second executable file, smaller in size than the first executable file, so that the software shim is operable to be executed in conjunction with the second executable file, the method comprising:
    modifying at least a portion of a header section of the second executable file to match that of the first executable file;
    padding the second executable file to increase the size of the second executable file to approximately equal that of the first executable file based on a difference between the size of the first executable file and the size of the second executable file;
    modifying at least a portion of the padded second executable file such that checksums of the first and padded second executable files are equal; and
    simulating the first executable file using the padded second executable file, so that the software shim is operable to be executed in conjunction with the padded second executable file.

2. A computer-readable medium having stored thereon computer-executable instructions for performing the method of claim 1.

3. The method of claim 1, wherein the step of modifying at least a portion of a header section comprises changing a value of the second padded executable file name to that of the first executable file.

4. The method of claim 1, wherein the step of modifying at least a portion of a header section comprises changing a value of the file size of the second padded executable file to that of the first executable file.

5. The method of claim 1, further comprising modifying at least a portion of a resource section of the second padded executable file so that the portion of the resource section of the second executable file matches that of the first executable file.

6. The method of claim 5, wherein the step of modifying at least a portion of a resource section comprises changing company name information of the second padded executable file to a name of a company that developed the first executable file.

7. The method of claim 5, wherein the step of modifying at least a portion of a resource section comprises changing product name information of the second padded executable file to a name of a product that includes the first executable file.

8. The method of claim 5, wherein the step of modifying at least a portion of a resource section comprises changing version information of the second padded executable file to match that of the first executable file.

9. The method of claim 5, wherein the step of modifying at least a portion of a resource section comprises changing internal name information of the second padded executable file to match that of the first executable file.

10. The method of claim 5, wherein the step of modifying at least a portion of a resource section comprises changing copyright information of the second padded executable file to match that of the first executable file.

11. The method of claim 1, wherein the padding step comprises adding dummy data to the second executable file.

12. The method of claim 1, the method further comprising:
    determining the value of the first executable file's checksum;
    determining a value to which a piece of data of the second padded executable file needs to be changed so that the second padded executable file's checksum will be approximately equal to the first executable file's checksum;
    storing the piece of data;
    replacing, in the second padded executable file, the piece of data with the determined value; and inserting one or more lines of code into the second padded executable file which, when executed, puts the piece of data back into the second padded executable file in place of the determined value.

13. In a computer system including a first executable file and a software shim, wherein the software shim is operable to be executed in conjunction with the first executable file, a method for simulating the first executable file using a second executable file, smaller in size than the first executable file, so that the software shim is operable to be executed in conjunction with the second executable file, the method comprising:
    generating the second executable file, wherein the second executable file is smaller in size than the first executable file;
    modifying at least a portion of a header section of the second executable file to match that of the first executable file;
    increasing the size of the second executable file to approximately equal that of the first executable file;

modifying at least a portion of the increased-size second executable file such that checksums of the first and increased-size second executable files are equal;

modifying at least a portion of the increased-size second executable file by undoing any changes made to the increased-size second executable file; and simulating the first executable file using the increased-size second executable file, so that the software shim is operable to be executed in conjunction with the increased-size second executable file.

14. A computer-readable medium having stored thereon computer-executable instructions for performing the method of claim 13.

15. The method of claim 13, wherein modifying at least a portion of a header section comprises changing a value of the second executable file name to that of the first executable file name and changing a value of the second executable file size to that of the first executable file size.

16. The method of claim 13 further comprising modifying at least a portion of a resource section of the increased-size second executable file so that the portion of the resource section of the increased-size second executable file matches that of a resource section of the first executable file.

17. In a computer system including an original file comprising a plurality of sections and a software shim operable to be executed on the original file, a method for simulating the original file by testing the software shim on a simulated file smaller in size than the original file, the original file having a plurality of sections, a file name and a file size, the method comprising:

generating the simulated file, wherein the simulated file comprises at least one of the plurality of sections of the original file;

modifying at least a portion of a header section of the simulated file to match that of the original file, wherein the modifying comprises changing a file name of the simulated file to match that of the original file and/or changing a file size of the simulated file to match that of the original file;

increasing the size of the simulated file to approximately equal that of the original file;

modifying at least a portion of the increased-size simulated file such that a checksum of the original file and the increased-size simulated file is equal;

modifying at least a portion of the increased-size simulated file by undoing any changes made to the increased-size simulated file;

integrating the software shim with the increased-size simulated file in order to test the increased-size simulated file; and simulating the original file by executing the software shim on the original file if the test of the simulated file is successful.

18. A computer-readable medium having stored thereon computer-executable instructions for performing the method of claim 17.

19. The method of claim 17 further comprising modifying at least a portion of a resource section of the simulated and increased-size file so that the portion of the resource section of the simulated and increased-size file matches that of a resource section of the original file, wherein modifying at least a portion of the resource section of the simulated and increased-size file comprising:

changing company name information of the simulated and increased-size file to a company name that developed the original file;

changing product name information of the simulated and increased-size file to a product name of the original file;

changing version information of the simulated and increased-size file to a version information of the original file;

changing internal name information of the simulated and increased-size file to an internal name of the original file; and changing copyright information of the simulated and increased-size file to a copyright of the original file.

\* \* \* \* \*